July 14, 1925.
D. KEMP
1,545,665
MEANS FOR LUBRICATING THE CYLINDER LINERS OF INTERNAL COMBUSTION ENGINES
Filed Sept. 24, 1924
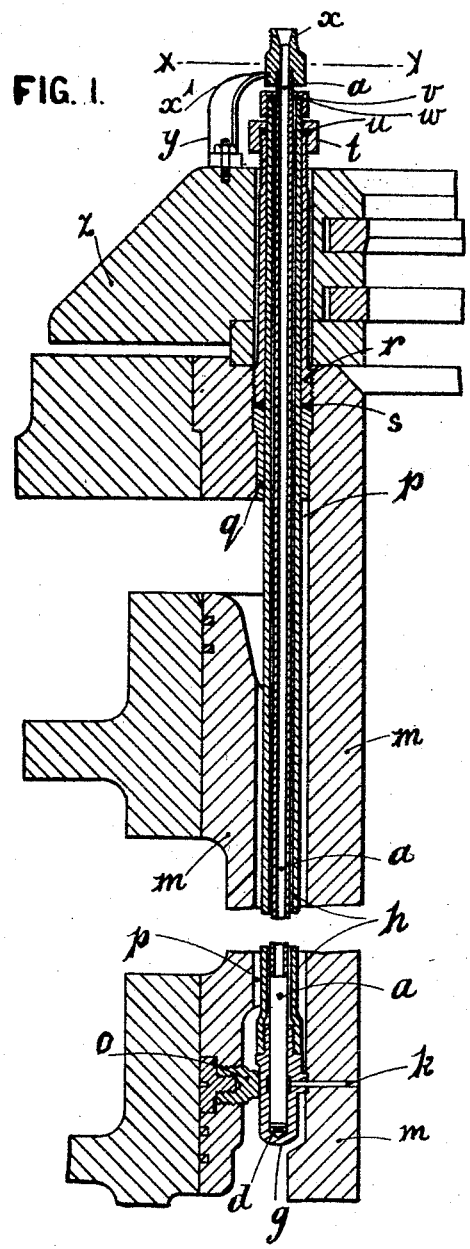
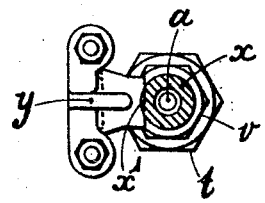
FIG. 2.
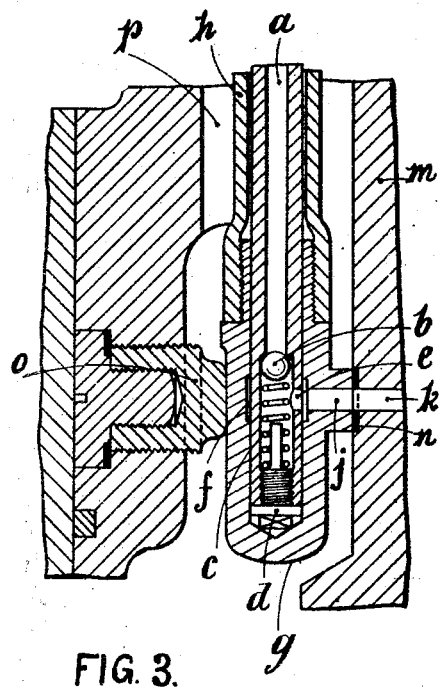
FIG. 3.
Inventor
Daniel Kemp,
By Toulmin & Toulmin,
Attorneys Patented July 14, 1925.

1,545,665

UNITED STATES PATENT OFFICE.

DANIEL KEMP, OF HEBBURN-ON-TYNE, ENGLAND, ASSIGNOR TO PALMERS SHIP-BUILDING AND IRON COMPANY, LIMITED, OF HEBBURN-ON-TYNE, ENGLAND.

MEANS FOR LUBRICATING THE CYLINDER LINERS OF INTERNAL-COMBUSTION ENGINES.

Application filed September 24, 1924. Serial No. 739,565.

*To all whom it may concern:*

Be it known that I, DANIEL KEMP, a subject of the King of Great Britain and Ireland, residing at Hebburn-on-Tyne, in the county of Durham, England, have invented certain new and useful Improvements in Means for Lubricating the Cylinder Liners of Internal-Combustion Engines, of which the following is a specification, reference being had therein to the accompanying drawing.

This invention relates to means for lubricating the cylinder liners of internal-combustion engines, and has particular reference to lubricating means of the kind, commonly fitted at the upper ends of the cylinder liners of engines of the opposed-piston type, where the lubrication pipes are led through the metal of the cylinder liner between the ports and communicate with a small lubrication port leading to the inner face of the liner at a particular point of the stroke of the piston. Hitherto it has been customary to provide a number of permanently fixed lubrication pipes each having a ball or other valve at the bottom pressed upwards on to its seat by a spring. Usually the water for cooling the cylinder liner encircles the lubrication pipe. In case of failure of the valve or the spring or the choking of the pipe, it is necessary to withdraw the cylinder liner to examine the valve and pipe, as the fitting containing the valve and spring is secured at the oil access port in the liner wall in such a manner that the fitting is not accessible otherwise. This is an operation of some magnitude in the case of large engines. The object of the present invention is to provide an improved construction wherein the necessity for the withdrawal of the cylinder liner to examine the lubrication pipe and valve is obviated.

According to my invention I provide a spring-pressed ball or other valve at the bottom of the lubrication pipe as usual, but I mount said pipe within an enclosing pipe which is secured to the cylinder liner, said lubrication pipe with its valve being capable of being withdrawn endwise from the enclosing pipe without disturbing the latter or the cylinder liner, when it is necessary to examine the pipe or valve.

I will fully describe my invention with reference to the accompanying drawings wherein Figure 1 is a sectional elevation, Figure 2 is a plan section on the line $x$—$y$ in Figure 1 to a larger scale and Figure 3 is an enlarged view of the lower end of the lubrication pipe, of one construction in accordance therewith.

Referring to the drawings, in the example therein illustrated, $a$ is the lubrication pipe fitted at the bottom with a ball valve $b$ pressed upwards on to its seat by a spring $c$ bearing on a plug $d$ screwed into the bottom of the pipe $a$. $e$ is a lateral aperture in the pipe opening into an annulus $f$ in a box $g$ at the bottom of a pipe or tubular casing $h$ enclosing the lubrication pipe $a$. The annulus $f$ communicates by a passage $j$ with the lubrication port $k$ in the cylinder liner $m$. The box $g$ is pressed into tight contact with a washer $n$ around the port $k$ by an adjustable stud $o$ in the liner $m$. The pipes $a$ and $h$ are disposed in a vertical bore $p$ in the cylinder liner and the cooling water circulates around the enclosing pipe $h$. At the upper end the bore $p$ is closed by a plug $q$. A sleeve $r$ is screwed into the liner above said plug and bears on packing $s$ thereon to make a tight joint. At its upper end the sleeve $r$ is provided with a nut $t$ which compresses packing $u$ against the enclosing pipe $h$ to make a tight joint. Similarly the upper end of the pipe $h$ is fitted with a nut $v$ which compresses packing $w$ against the lubrication pipe $a$ to make a tight joint. $x$ is a coupling whereby the upper end of the pipe $a$ is connected to the lubricant supply. If desired the coupling $x$ may be in one with the nut $v$ and serve to make a tight joint between the pipes $h$ and $a$. $y$ is a location bracket mounted on the liner extension $z$ or in other convenient position. When the end of the location bracket $y$ engages the slot $x^1$ in the coupling $x$, the aperture $e$ at the bottom of the lubrication pipe $a$ is in alignment with the passage $j$ leading to the lubrication port $k$ in the liner $m$. The location bracket $y$ also prevents the pipe $a$ being displaced by any pressure on the lower end of the pipe.

The enclosing pipe $h$ will preferably be of stainless steel to avoid corrosion by the cooling water encircling it; the lubrication pipe $a$ may be of solid drawn steel.

It will now be seen that the pipe $h$ closes the lubrication pipe $a$ off from the cooling water in the bore $p$ in the cylinder liner, and, when necessary, the pipe $a$ with the valve $b$ can be readily withdrawn by removing the nut $v$ and without disturbing the enclosing pipe $h$ or the cylinder liner.

I wish it to be understood that my invention is not limited to the details of the construction illustrated in the drawings and that such details may be modified without departing from the spirit of my invention; for example, other means for locating the lubrication pipe in proper position and for sealing the outer ends of the pipes may be adopted.

What I claim and desire to secure by Letters Patent is:—

1. In an internal combustion engine fitted with cylinder liners, means for lubricating said liners comprising a lubrication pipe within the liner, a non-return valve mounted at the bottom of said pipe, both said pipe and cylinder liner being provided with ports adapted to register, means for maintaining said ports in registry, and a tubular casing enclosing said lubrication pipe within the liner, said lubrication pipe and its valve being withdrawable endwise from said tubular casing without disturbing the latter or the liner.

2. In an internal combustion engine fitted with cylinder liners, means for lubricating said liners comprising a lubrication pipe within the liner, a non-return valve mounted at the bottom of the lubrication pipe, a tubular casing enclosing said lubrication pipe within the liner, a box on the bottom of said casing, said liner, said lubrication pipe and said box being provided with ports adapted to register, and means for maintaining said ports in registry, said lubrication pipe and its valve being withdrawable endwise from the tubular casing without disturbing the latter or the liner.

3. In an internal combustion engine fitted with cylinder liners, means for lubricating said liners comprising a lubrication pipe within the liner, a non-return valve mounted at the bottom of the lubricating pipe, a tubular casing enclosing said lubricating pipe within the liner, a box on the bottom of said tubular casing, said liner, said lubrication pipe and said box being provided with ports adapted to register, and means for maintaining said ports in registry, said means comprising a slot in the head of the lubricating pipe and a locating bracket adjacent thereto coacting with said slot, said locating bracket also retaining the lubricating pipe in position against any pressure on the lower end thereof, said lubricating pipe and its valve being withdrawable endwise from said tubular casing without disturbing the latter or the liner.

In testimony whereof, I affix my signature.

DANIEL KEMP.